April 12, 1960 C. F. CLARK ET AL 2,932,580
PIGMENT CONCENTRATE
Filed Aug. 30, 1955
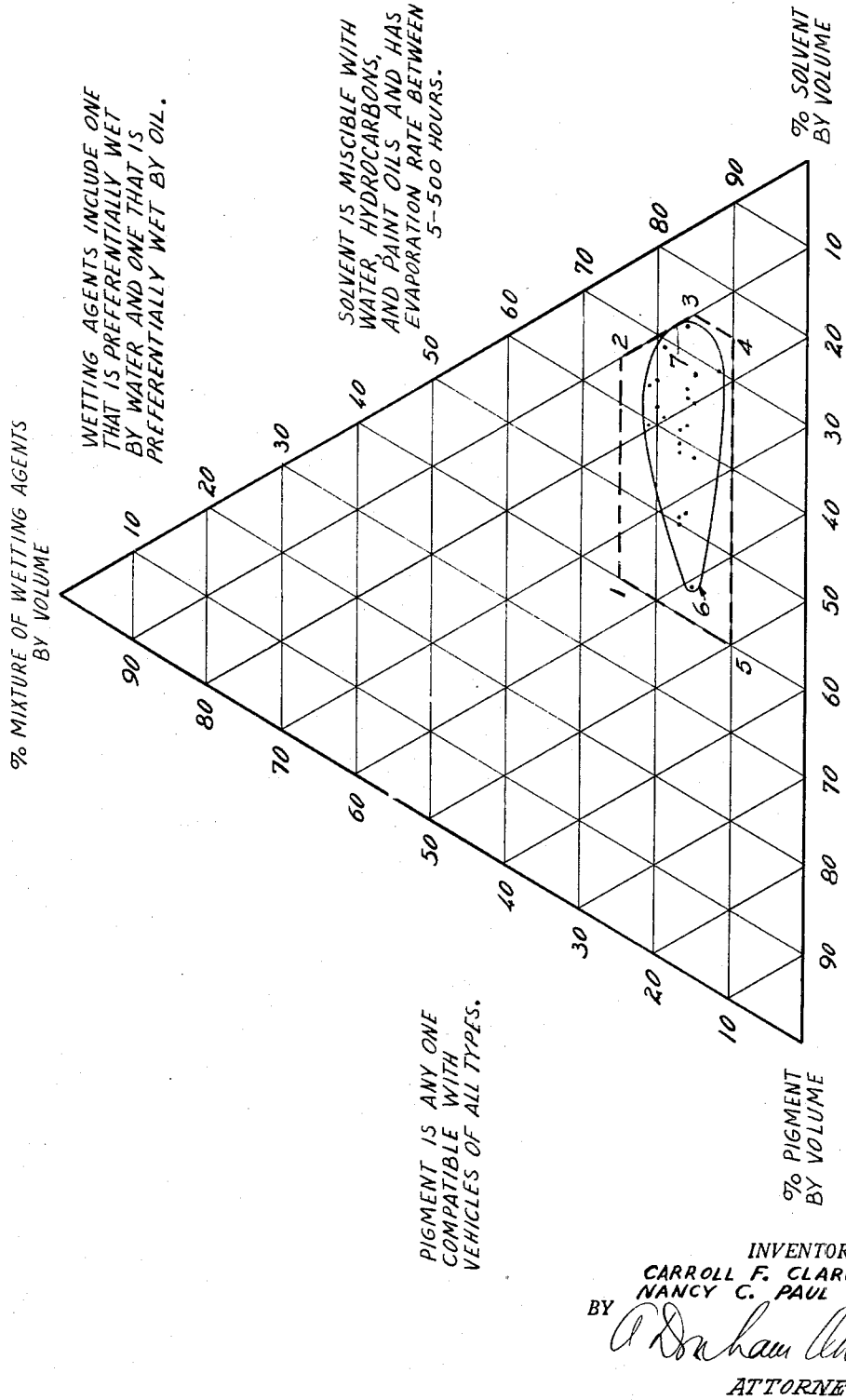
INVENTORS
CARROLL F. CLARK
NANCY C. PAUL
BY
ATTORNEYS United States Patent Office 2,932,580
Patented Apr. 12, 1960

2,932,580
PIGMENT CONCENTRATE

Carroll F. Clark, San Mateo, and Nancy C. Paul, Burlingame, Calif., assignors to W. P. Fuller & Co., San Francisco, Calif., a corporation of California Application August 30, 1955, Serial No. 531,558

12 Claims. (Cl. 106—308)

Our invention relates to an improved pigment concentrate characterized by such a remarkable compatibility with paints and paint vehicles of all types that it can, for all practical purposes, be termed a "universal pigment concentrate." In other words, our new pigment concentrate can be added to and mixed with white paint, colored paint, and paint containing inert fillers, no matter whether the paint vehicle is oil, latex, or other type of vehicle.

This "universal" pigment concentrate has solved many problems in the paint industry. Four of its principal fields of use illustrate its great usefulness, the problems solved, and the objects of our invention: (1) its application to a "tube system," (2) its use by professional painters in varying tints, (3) its applicability to the manufacture of factory-mixed tints, and (4) its simplification of the factory preparation of small batches of special-order paints.

(1) The "tube system" is a method of obtaining any one of many predetermined colors of paint by adding a standard pre-mixed amount (e.g., two 4 oz. tubes) of pigment concentrate to a standard pre-measured amount (e.g., a gallon can) of paint. The system makes it possible for a dealer to offer many colors of paint for sale without having to carry in stock factory-mixed paint in each color. The result is a minimum inventory cost (since the pigment tubes are less expensive than mixed paint) and a great saving in storage space (since the tubes take up less room than cans of mixed paint).

For example, a tube system can be set up employing a relatively small number (2 to 20) of different tubed pigment concentrates, together with a stock of colored paints (6 to 20) in each of a number of different vehicles. If the tubes are used at a rate of two tubes per can of paint, 7 colors of pigment concentrate may be combined with 12 basic paints to give at least 96 different colors (hues, tints, and shades).

Another type of tube system uses many more different colors of tubed concentrate (10 to 100) but only two basic paints of each vehicle—a high-tinting strength (i.e., white paint) for tints, and a paint of low tinting strength composed primarily of inert pigments for deeper colors. Thus, the two paints can be combined with only 20 different tubed pigments to give more than 400 useful colors that differ in hue, tint, or shade from each other.

Although the simplicity of the tube system commends it, heretofore each pigment concentrate was limited to use with a very few, or even only one, of the many types of paint vehicles. A tube system that worked well with linseed oil paints was completely incompatible with latex paints and with other vehicles. This meant that there had to be a separate series of pigment concentrates for each type of vehicle, thereby limiting the value of the "tube system." A really successful pigment concentrate—a "universal" pigment concentrate—must give satisfactory results in paint with vehicles of all types such as: natural oils, treated oils, bodied oils, varnishes, long-oil alkyds, medium-oil alkyds, short-oil alkyds, styrenated oils and alkyds, ureas, melamines, ureamelamines, nitrocellulose, ethyl cellulose, chlorinated rubbers, acrylic latex, polyvinyl acetate latex, styrenebutadiene latex, alkyd emulsions, polyvinyl chloride latex, and polystyrene latex. Until the present invention, there was no pigment concentrate that would work with all these vehicles. An object of the present invention is to provide such a "universal" pigment concentrate.

In order to make the "tube system" worthwhile, it has to be complete, there has to be a full color wheel of available pigments. There have been problems in getting the color wheel complete because some pigments give more trouble than others. Thus, chrome yellow tends to be very compatible and easy to incorporate into many vehicles, whereas phthalocyanine green and blue are both difficult to get into some vehicles. The present invention has as one of its objects the provision of a complete color wheel in a "tube system" with vehicles of all types.

Compatibility and stability of pigments in vehicles may be tested by float check and rub-up check. A float check is made by painting the pigmented paint on a small panel, cross brushing it, and then, while the paint is still wet, a fresh brush-load of the same paint is flowed on over the initially applied paint in one corner of the panel. If the newly flowed-on paint is lighter than the rest of the panel, pigment flocculation is indicated.

A rub-up check may be made by rubbing one's finger around several times on a portion of a freshly painted panel, using a circular motion. Development of color in the rubbed-up portion indicates incomplete pigment dispersion.

Another object of the invention is to provide pigment concentrates which, when mixed with paints in various vehicles, give good commercial color matches and show no color change in either the float check or the rub-up check.

Another problem with a "tube system" is to achieve a viscosity of the pigment concentrates suitable for use in flexible tubes. Too stiff a paste cannot be forced out of a tube, and, more important, does not disperse rapidly enough in the paint when mixed. Too thin a material not only will run and get out of control and require excessively large tubes to give the same pigmentation in a paint, but the pigment in it will have a tendency to settle out. It is an object of the invention to solve this viscosity problem.

(2) Professional painters are often called upon for various tints, shades, and hues which differ from what they ordinarily carry in stock. Heretofore (except with oil paints, where pigmented pastes were available) they have had to mix their already-mixed paints of different colors until the desired color was obtained. This was an unwieldy and inaccurate system, and the results were difficult to reproduce. An object of the present invention is to provide a color wheel of pigment concentrates in paste form for easy mixing with prepared paints in all types of vehicles for obtaining any shade or tint that may be desired.

Tubes of pigment concentrate may again be used, but most professional painters prefer to purchase their supplies in larger quantities, and prefer cans of the paste to tubes. Twelve tinting colors are usually enough for tinting any white paint or altering any deep color in any paint or lacquer.

In both the tube system and in a painter's tinting system, it is necessary that the solvent in the paste evaporate at the proper rate. Where evaporation is too slow, the paint will not dry fast enough, and where it is too fast, the paste will dry too fast and be difficult to store, and the paint will be difficult to work and will harden in the can. For trade sales, the incorporation of an intermediate-to-slow evaporating solvent in the pigment paste makes a better working material while still maintaining the properties of the original product and preventing the paste from drying out in the tube or other container. For this purpose, solvents which evaporate 100% in between about 50 and 500 hours are adequate. For industrial use, fast solvents which evaporate in between about 5 and 100 hours are often preferred.

(3) In the paint factory, the problems are different, but related. One problem has been the mixing of tints, where various amounts of colors are to be added to white paint to produce tints. Only a small amount of pigment is added to each batch, and the orders for this factory-mixed paint in tints varies from day to day. The problem here was to maintain stocks on hand that could be added, as required, to every type of vehicles. A large paint factory may use two or three hundred different vehicles, and no one pigment concentrate could heretofore be mixed with all these. Our new "universal" pigment concentrate can.

The former practice in one paint factory was to grind in each of the tinting colors into each of seven types of vehicles, to meet their standard needs. Thus, some of each pigment would be ground into a mixture of mineral spirits and linseed oil, and this was later added as a tinting concentrate to white linseed oil paint. For alkyd-resin paint, the pigment was ground into an alkyd resin vehicle thinned with mineral spirits. This concentrate could not be added to linseed oil, nor could the oil concentrate be added to an alkyd vehicle, without flocculation or float.

For the same reason, each of the same assortment of pigments was ground into a medium-oil-length varnish thinned with mineral spirits, for addition to various white varnish paints; each pigment was ground into a melamine-formaldehyde vehicle to which toluol or xylol and mineral spirits were added; each pigment was ground into a urea-formaldehyde vehicle along with added toluol or xylol and mineral spirits; each pigment was ground into soya protein and water for use in water-protein base paints; and pigment was ground into toluol or xylol for use in styrene-butadiene solvent base paints. No one of these would mix with other types of vehicles. Nor could the pigment be ground simply into a solvent—such as toluol or mineral spirits—because seed flocculation or float would result.

The present invention solves this problem by providing a pigment concentrate than can be added to paints employing all types of vehicles, without flocculation or float. It is therefore being used in the factory preparation of tints.

(4) "Special order" paints are costly to prepare. Any batch of less than about a hundred gallons prepared to match a special color ordinarily costs about $50.00 just for the laboratory formulation, exclusive of the materials. Partly, this is because even the prior-art concentrates referred to in the previous section cannot be used for deep colors. For example, the linseed oil concentrate has a particular kind of linseed oil in it, and when enough concentrate is added to obtain a deep color (as distinct from a tint, where only a small amount of concentrate is used), the properties of the particular linseed oil used as the main vehicle are altered. For this reason, no pigment concentrates of the prior-art type could be used to obtain deep colors, and even on these small, special-order batches, the pigment had to be ground directly into the particular vehicle to be used.

Our pigment concentrate makes it possible to use the same paste for making small batches of deep colors as are used for making tints, the paste being added to any type of vehicle containing enough inert pigments to give the desired body. Thus, considerable savings become possible in special-order lots. There is no need for a laboratory formulation to balance pigments and inert fillers. Any skilled color man can mix the concentrates with the desired paint and come out with the desired color.

A feature of the present invention is that our concentrate contains no vehicle itself, and thus incompatibility of vehicles is obviated. However, much more than this is necessary, and our concentrate is a unique mixture of pigments, certain solvents, and of certain wetting agents which make it possible to obtain dispersion in vehicles of all types even when the vehicles contain other pigments, and no float or flocculation results.

Other objects and advantages of the invention will appear from the following description of a preferred embodiment thereof, presented in accordance with 35 U.S.C. 112.

The drawing, the single figure is a triangular graph showing the range of proportions, by volume, of pigment, wetting agent, and solvent in our invention, and also showing, as points, the composition of many specific preparations, all falling within this range.

The irregular polygon 1, 2, 3, 4, 5 defined by the lines connecting the points identified by the numerals 1 to 2 to 3 to 4 to 5 and 5 to 1, designates the area defining the relationship of pigment to solvent to wetting agent to obtain the composition of applicants' invention. The approximately elliptical shape figure 6, 7, connecting the points 6 to 7 to 6, defines the area of the preferred proportions of pigment to solvent to wetting agent.

The invention can be used with practically all commonly used paint pigments and comprises a novel combination with the pigments of a certain class of wetting agent and a certain class of solvent.

Considering the solvent first, our invention employs a solvent which is water-miscible and is also miscible with such water-immiscible materials as hydrocarbon-solvents. Preferably, a solvent is selected with an evaporation rate of between about 5 and 500 hours, and which will give a paste viscosity (when combined with the pigment and wetting agents) lying in the range of between 70 and 140 Kreb units, measured on a Kreb's Stormer viscosimeter, so that the pigment concentrate paste will break up readily on stirring and will move through a flexible tube.

Two solvents that meet the above conditions and have given very satisfactory operation with many pigments in bases of all types are diacetone alcohol and a mixture of the mono-, di-, and tri-propylene glycols of methyl ether preferably consisting of about 40% of the mono-, 42% of the di-, and 18% of the tri-propylene glycol. Sometimes better results are obtained by using only one of these solvents and sometimes better results are obtained from mixtures of the two, for they are fully miscible and compatible with each other. The diacetone alcohol has an evaporation rate of about 56 hours, and the glycol-ether mixture has a rate of about 421 hours. The glycol-ether mixture apparently gives better results with green, blue, and organic red pigments, and the diacetone alcohol is suitable for use with other pigments.

Some solvents also give good results, including especially propylene glycol of methyl ether. Many solvents answering the miscibility requirements evaporate too quickly (in a few minutes) to be practical (e.g., acetone, ethanol). The following Table I lists satisfactory solvents and their evaporation rates. The 4-hour rate of dimethyl Cellosolve is barely satisfactory, and for most purposes rates over 500 hours are rather too long. Yet for some purposes, all the solvents listed give satisfactory results, though diacetone alcohol and the mono-di-tri-propylene glycol of methyl ether are preferred.

TABLE I

*Evaporation rate of various solvents giving satisfactory results*

| Solvent | Hours for 100% Evaporation |
|---|---|
| Cellosolve (ethyl ether of ethylene glycol) $CH_3CH_2OCH_2CH_2OH$ | 25 |
| Carbitol (ethyl ether of diethylene glycol) $CH_3CH_2(OC_2H_4)_2OH$ | 980 |
| Diethyl Cellosolve | 6½ |
| Diethyl Carbitol | 230 |
| Dimethyl Cellosolve | 4 |
| Dimethyl Carbitol | 200 |
| Butyl Cellosolve | 130 |
| Butyl Carbitol | 5,000 |
| Isopropyl Cellosolve | 31 |
| Methyl Cellosolve | 17 |
| Methyl Carbitol | 930 |
| Cellosolve acetate | 38 |
| Carbitol acetate | 1,500 |
| Methyl Cellololve acetate | 26 |
| Methyl Carbitol acetate | 960 |
| Butyl Cellosolve acetate | 290 |
| Butyl Carbitol acetate | 10,000 |
| Diacetone alcohol (4-hydroxy-4-methyl-2-pentanone) | 56 |

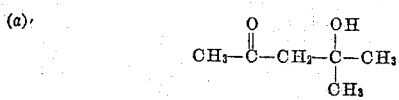

| | |
|---|---|
| Propylene glycol of isopropyl ether | 28 |
| Propylene glycol of butyl ether | 125 |
| Ethylene glycol of butyl ether | 137 |
| Propylene glycol of methyl ether | 10 |

| | |
|---|---|
| Dipropylene glycol of methyl ether $CH_3-O-CH_2-CH_2-CH_2-O-CH_2-CH_2-CH_2-OH$ | 375 |
| Tripropylene glycol of methyl ether $CH_3-O-C_3H_6-O-C_3H_6-O-C_3H_6-OH$ | 2,000 |
| Ethylene glycol of isopropyl ether | 32 |
| Mono-di-tri-propylene glycol of methyl ether, comprising: 40% propylene glycol of methyl ether 42% dipropylene glycol of methyl ether 18% tripropylene glycol of methyl ether | 421 |

It will be noted that diacetone alcohol is the only ketone alcohol that works, and that all the other solvents listed in Table I are ether-glycols or acetates thereof. Chemically, the limits of the usable solvents may be expressed, formula-wise, by the following four formulas, from which the solvent is chosen, either by selecting one or by selecting a mixture of two or more:

(a) 

(b) $\quad CH_3(CH_2)_m-O-(CH_2)_n-O-R_1$ (c) $CH_3(CH_2)_m-O-(CH_2)_n-O-(CH_2)_p-O-R_1$ (d) $CH_3(CH_2)_q-O-(CH_2)_n-O-$
$\qquad (CH_2)_p-O-(CH_2)_r-O-R_2$ where $R_1$ is a radical chosen from the group consisting of (1) $\quad -H$ (2) 
$$-\overset{O}{\underset{\|}{C}}-CH_3$$

and (3) $\quad -(CH_2)_sCH_3$ and $R_2$ is a radical chosen from the group consisting of (1) $\quad -H$ (2) 
$$-\overset{O}{\underset{\|}{C}}-CH_3$$

and (3) $\quad -(CH_2)_tCH_3$ and where $m$, $n$, $p$, $q$, $r$, $s$, and $t$ represent integers, $m$, $r$, and $s$ having any value of 0 through 3, $n$ and $p$ any value of 2 through 3, and $q$ and $t$ any value of 0 through 1. It will be noted that $R_1$ and $R_2$ are almost identical.

Another way of grouping the workable solvents other than diacetone alcohol is to call them the alkyl (methyl through butyl) ethers and acetates of the ethylene (mono- and di-) and propylene (mono-, di-, and tri-) glycols, having between 3 and 14 carbon atoms.

The wetting agent is also important. So far as is known, there is no one wetting agent that will give complete satisfaction for the purposes of our invention. We use a combination of at least two wetting agents as a feature of the present invention: one of the wetting agents acts on the pigment to achieve dispersion in the various oil-type vehicles, while the other one acts on the pigment to enable dispersion in water-type (e.g., latex) vehicles. The wetting agent that particularly aids dispersion in oil-type vehicles, is preferably soya lecithin (which comprises the phosphatides of soy bean oil and contains hydrophobic fatty acid groups on one end and hydrophilic phosphoric acid ethers on the other end). This agent does not aid, and also does not interfere with, dispersion in latex vehicles. The other wetting agent does not, by itself, give a satisfactory dispersion in oil-type vehicles, but it does give excellent results with latex vehicles, where water is the dispersing liquid, and it is completely soluble in oils, so that it does not interfere with the dispersing-in-oil action of the soya lecithin. The agents to accomplish this preferential dispersion in water—at least the ones we prefer—are rather complex. For convenient reference in the tables that follow we shall refer to them by abbreviated titles:

Agent No. 1 is a condensation product (not an ester) of a high-heat (300°–375° F.) reaction between a fatty acid having at least eight carbon atoms per molecule, a stoichiometric excess of a dialkanolamine, and ethylenediamine tetraacetic acid. Any fatty acid or mixture of fatty acids, either saturated or unsaturated, having eight or more carbon atoms may be used, including oleic, lauric, and stearic acids. Any common dialkanolamine (e.g., diethanolamine, dipropanolamine, and ethanol butanolamine) may be used; preferably the ratio of its NH radicals to the acid's COOH radicals is between 1.1 to 1 and 1.3 to 1. The exact nature of the reaction is not known, nor is the exact nature of the resulting products.

Agent No. 2 is a mixture of Agent No. 1 with a fatty acid ester of polyethylene glycol, the ester having a molecular weight between about 200 and 400, the fatty acid being preferably unsaturated and having between 12 and 18 carbon atoms. Preferably, the ester is the predominant ingredient, the ratio to Agent No. 1 lying in the range of between about 5:1 and 7:1.

Agent No. 3 is a mixture of Agent No. 1, the ester of Agent No. 2, and the reaction product of an ethyleneamine (e.g., triethylene tetramine, tetraethylene pentamine, etc.) with an unsaturated fatty acid having between 12 and 18 carbon atoms. The ratio of Agent No. 1, the ester of Agent No. 2, and the reaction product just mentioned, is preferably about 2:1:1.

Agent No. 2 is generally preferred, though for most uses Agent No. 3 may be substituted for it, and in some formulas, an extra amount of Agent No. 1 is added (in effect changing the ratio of Agent No. 1 to the ester).

We note here that we have tried many other wetting agents and that some of them worked for some pigments and some vehicles but no others that we tried were universally adaptable. Thus, a compound known on the market as Igepal CA, which is alkyl phenoxy polyoxyethylene ethanol, was compatible for chrome yellow with latex-base paint in water, alkyd vehicles, and varnish vehicles, but was not successful with other pigments such as the phthalocyanine pigments. Similarly, a compound known as Alkaterge C, which is substituted oxazoline, and another compound known as Triton X-45, which is alkyl aryl polyether alcohol, do well except in water- or latex-type vehicles; but are completely insoluble in them.

It should be understood that the specific proportions vary greatly according to the pigment, and that the weights of pigments vary very greatly. Thus 200 pounds of lampblack composes about 11% of the volume of a 100 gallon mixture, while 1500 pounds of chrome yellow comprises about 32% of the volume of another 100 gallon mixture. For this reason, the range of values which is satisfactory is given in percentages by volume. Thus, for each 100 gallon mixture, diacetone alcohol (or mono-di-tripropylene glycol of methyl ether) may be used in quantities of between about 40 and 75 or 80 gallons. The pigment wetting agent for dispersion in water may vary between about 8 and 18 gallons, and the soya lecithin or pigment wetting agent for dispersion in oil may vary between about 1 and 8 gallons. Where an excess of Agent No. 1 is used, about one or two gallons were added. Table II summarizes this general formulation, which is indicated on the drawing by broken lines enclosing an area.

TABLE II
Summary of approximate composition of universal pigment concentrate Solvent compatible with vehicles of all types and having an evaporation rate of between 5 and 500 hours (preferably diacetone alcohol or mono-di-tri-propylene glycol of methyl ether)—about 40% to 75% by volume Wetting agent combination of two or three pigment wetting agents, at least one achieving dispersion-in-oil-type vehicles of the pigment, and one achieving dispersion-in-water-type vehicles—about 10% to 25% by volume The water-dispersion pigment wetting agent (preferably Agent No. 2, the 1:5 to 1:7 mixture of the condensate of a dialkanolamine, a fatty acid having at least 8 carbon atoms, and ethylenediamine tetraacetic acid with the ester of an unsaturated fatty acid having 12 to 18 carbon atoms and polyethylene glycol) comprising between 8% and 20%

The oil-dispersion pigment wetting agent (preferably soya lecithin) comprising between 1% and 8%

A third agent (preferably Agent No. 1, the condensate of a dialkanolamine, a fatty acid having at least 8 carbon atoms, and ethylenediamine tetraacetic acid) comprising 0% to 2%

Pigment (its weight varies considerably—about 10% to 40% by volume

Total volume of pigment concentrate in paste form having a viscosity between about 70–140 Kreb units—100%

As will be noted, the ratio of total solvent to total wetting agent varies between about 2.4 to 1 to about 5.2 to 1, or stated approximately, from about 2½ to 1 to 5 to 1. Almost all of the examples lie within the range between 2.9 to 1 and 4.5 to 1. The ratio of Agent No. 2 to soya lecithin varies from 15 to 1 to 1 to 1, with most use occurring in the range of between 7 to 1 and 2 to 1.

The following specific pigments have been tried and produced satisfactory concentrates when mixed with either diacetone alcohol or mono-di-tri-propylene glycol of methyly ether or a mixture of the two, and with a mixture of Agent No. 2 and soya lecithin wetting agents. Every one of the resultant pastes gave satisfactory results with paints in vehicles of all types and met both the rub-up and float checks.

TABLE III
Pigments actually tried with satisfactory results in paint bases of all types

| Trade Name | Chemical Composition |
| --- | --- |
| Blacks: | |
| 1. Carbon black | Carbon. |
| 2. Lampblack | Do. |
| 3. Black oxide | Iron oxide, $Fe_3O_4$. |
| Blues: | |
| 1. Phthalocyanine blue | Copper phthalonitrile. |
| 2. Ultramarine blue | Complex combination of: Sodium carbonate, alumina and silica containing sulphur. |
| Greens: | |
| 1. Chromium oxide | Chromium oxide. |
| 2. Phthalocyanine green | Chlorinated copper phthalonitrile. |
| 3. Pigment green B | Iron salt of nitroso beta-naphthol. |
| Iron oxides: | |
| 1. Ferrite yellow oxide | Hydrated ferric oxide. |
| 2. Red oxide | Ferric oxide. |
| 3. Brown oxide | Blend of red, yellow, black oxides. |
| 4. Tan oxide | Do. |
| Natural earth oxides: | |
| 1. Raw sienna | Hydrated ferric oxide. |
| 2. Burnt sienna | Calcined raw sienna. |
| 3. Raw umber | Hydrated iron oxide, manganese dioxide. |
| 4. Burnt umber | Calcined raw umber. |
| Organic reds and maroons: | |
| 1. Toluidine red | Azo pigment coupling: 1. Meta Nitro-para-toluidine. 2. Beta naphthol. |
| 2. Red toner (Parachlor red) | Azo pigment coupling: 1. Ortho-chlorparanitranaline. 2. Beta naphthol. |
| 3. Para toner | Azo pigment coupling: 1. Para-nitranaline. 2. Beta naphthol. |
| 4. Alkali resistant red | Azo pigment—Naphthanil type. |
| 5. BON red | Mono-azo couplings of various organic amines with beta-oxy naphthoic acid. |
| 6. BON maroon | |
| 7. Cadmium red | Cadmium sulfo-selenide co-formed with barium sulfate base. |
| 8. Watchung red | Azo pigment coupling: 1. Ortho chlorparatoluidine metasulfonic acid. 2. Beta oxy naphthoic acid. |
| 9. Madder lake | Calcium salt of alizarine precipitated on alumina hydrate. |
| 10. Duratone red | Mixture of: 1. Mono-azo couplings of various organic amines with beta oxy naphthoic acid. 2. Azo coupling of: Ortho chlorparanitranaline beta naphthol. |
| 11. Carmine red | Calcium salt of azo dye 4 amino toluene 3 sulfonic acid coupled to beta oxy naphthoic acid. |
| Chrome yellow and chrome orange: | |
| 1. Chrome yellow | Lead chromate. |
| 2. Chrome orange | Lead chromate—lead oxide. |
| 3. Hansa yellow | Azo coupling: 1. Meta-nitro-para-toluidine. 2. Acetoacetanilide. |
| 4. Cadmium yellow | Cadmium sulfide co-formed with barium sulfate base. |
| 5. Green gold | Nickel azo complex—Patented U.S. Patent No. 2,396,327. |
| Whites: | |
| 1. Zinc oxide | Zinc oxide. |
| 2. Leaded zinc oxide | Leaded zinc oxide. |
| 3. White lead | Lead oxide. |
| 4. Titanium dioxide | Titanium dioxide. |
| 5. Titanium calcium | Titanium dioxide, calcium sulfate |
| 6. Lithopone | Zinc sulfide, barium sulfate. |
| Extenders: | |
| 1. Silica | Silica dioxide. |
| 2. Diatomaceous silica | Diatomic silica dioxide. |
| 3. Talc | Magnesium silicate. |
| 4. Aluminum silicate | Aluminum silicate. |
| 5. Calcium carbonate | Calcium carbonate. |
| 6. Mica | Iron oxide, alumina, magnesia, titanium dioxide, silica. |
| 7. Barium sulfate | Barium sulfate. |

It may be remarked that some pigments cannot be used at all with latex (water base) paints, because these pigments are either acid or alkali unstable and so either break the emulsion or are color fugitive. Examples are iron blue, chrome green, molybdate orange, and zinc yellow. With these exceptions, which do not break the color wheel since other pigments can be used to get the same end color effect, practically any pigment works, and these exceptions work with the other paint bases.

Table IV gives typical formulas using many of the above pigments. Each of the resulting concentrates is compatible with examples of each type of vehicle. Each formula has been located on the drawing by points though without specific identification, which is unnecessary and would only tend to confuse. The preferred range is indicated by the smooth curve around these points.

TABLE IV

*Specific examples of formulas using the present invention*

EXAMPLE 1 (GREEN)

| | | |
|---|---|---|
| Phthalocyanine green | lbs | 270 |
| Soya lecithin | lbs | 32 |
| Agent No. 2 | gals | 15 |
| Mono-di-tri-propylene glycol of methyl ether (hereafter in this table called MDT) | gals | 69 |
| Gals | | 100 |

EXAMPLE 2 (RED)

| | | |
|---|---|---|
| BON red | lbs | 322 |
| Soya lecithin | gals | 5 |
| Agent No. 2 | gals | 15 |
| MDT | gals | 62 |
| Gals | | 100 |

EXAMPLE 3 (RED)

| | | |
|---|---|---|
| Para toner red | lbs | 290 |
| Soya lecithin | lbs | 8 |
| Agent No. 2 | gals | 15 |
| MDT | gals | 62 |
| Gals | | 100 |

EXAMPLE 4 (RED)

| | | |
|---|---|---|
| Watchung red | lbs | 250 |
| Soya lecithin | lbs | 5 |
| Agent No. 2 | gals | 10 |
| MDT | gals | 68 |
| Gals | | 100 |

EXAMPLE 5 (RED)

| | | |
|---|---|---|
| Red oxide | lbs | 900 |
| Soya lecithin | lbs | 16 |
| Agent No. 2 | gals | 10 |
| Diacetone alcohol | gals | 70 |
| Gals | | 100 |

EXAMPLE 6 (REDDISH BROWN)

| | | |
|---|---|---|
| Burnt umber | lbs | 700 |
| Soya lecithin | lbs | 32 |
| Agent No. 2 | gals | 15 |
| Diacetone alcohol | gals | 61½ |
| Gals | | 100 |

EXAMPLE 7 (REDDISH BROWN)

| | | |
|---|---|---|
| Burnt sienna | lbs | 800 |
| Soya lecithin | lbs | 8 |
| Agent No. 2 | gals | 15 |
| Diacetone alcohol | gals | 61 |
| Gals | | 100 |

EXAMPLE 8 (BLUE)

| | | |
|---|---|---|
| Phthalocyanine blue | lbs | 224 |
| Soya lecithin | gals | 4 |
| Agent No. 2 | gals | 17 |
| MDT | gals | 64 |
| Gals | | 100 |

EXAMPLE 9 (RED)

| | | |
|---|---|---|
| Fire red toner | lbs | 290 |
| Soya lecithin | lbs | 8 |
| Agent No. 2 | gals | 15 |
| MDT | gals | 66 |
| Gals | | 100 |

EXAMPLE 10 (RED)

| | | |
|---|---|---|
| Duratone red | lbs | 300 |
| Soya lecithin | lbs | 8 |
| Agent No. 2' | gals | 15 |
| MDT | gals | 65 |
| Gals | | 100 |

EXAMPLE 11 (MAROON)

| | | |
|---|---|---|
| Toluidine toner | lbs | 250 |
| Soya lecithin | gals | 5 |
| Agent No. 2 | gals | 10 |
| MDT | gals | 65 |
| Gals | | 100 |

EXAMPLE 12 (YELLOW)

| | | |
|---|---|---|
| Ferrite yellow | lbs | 800 |
| Soya lecithin | gals | 1 |
| Agent No. 2 | gals | 15 |
| Diacetone alcohol | gals | 62 |
| Gals | | 100 |

EXAMPLE 13 (BROWN)

| | | |
|---|---|---|
| Raw umber | lbs | 700 |
| Soya lecithin | lbs | 16 |
| Agent No. 2 | gals | 15 |
| Diacetone alcohol | gals | 59½ |
| Gals | | 100 |

EXAMPLE 14 (BROWNISH YELLOW)

| | | |
|---|---|---|
| Raw sienna | lbs | 800 |
| Soya lecithin | lbs | 16 |
| Agent No. 2 | gals | 15 |
| Diacetone alcohol | gals | 59½ |
| Gals | | 100 |

EXAMPLE 15 (BLACK)

| | | |
|---|---|---|
| Lampblack | lbs | 200 |
| Soya lecithin | gals | 8 |
| Agent No. 2 | gals | 8 |
| Diacetone alcohol | gals | 73 |
| Gals | | 100 |

EXAMPLE 16 (YELLOW)

| | | |
|---|---|---|
| Chrome yellow primrose | lbs | 1,500 |
| Soya lecithin | lbs | 8 |
| Agent No. 2 | gals | 15 |
| Agent No. 1 | gals | 1 |
| Diacetone alcohol | gals | 50 |
| Gals | | 100 |

EXAMPLE 17 (YELLOW)

| | | |
|---|---|---|
| Chrome yellow dark | lbs | 1,500 |
| Soya lecithin | lbs | 8 |
| Agent No. 2 | gals | 15 |
| Agent No. 1 | gals | 1 |
| Diacetone alcohol | gals | 58½ |
| Gals | | 100 |

EXAMPLE 18 (GREENISH YELLOW)

| | | |
|---|---|---|
| Green gold | lbs | 300 |
| Soya lecithin | lbs | 8 |
| Agent No. 2 | gals | 14 |
| MDT | gals | 65 |
| Gals | | 100 |

EXAMPLE 19 (WHITE)

| | | |
|---|---|---|
| Rutile RANC titanic dioxide | lbs | 1,010 |
| Soya lecithin | lbs | 8 |
| Agent No. 2 | gals | 14 |
| Diacetone alcohol | gals | 59 |
| Gals. | | 100 |

EXAMPLE 20 (GREEN)

| | | |
|---|---|---|
| Chromium oxide | lbs | 1,500 |
| Soya lecithin | lbs | 8 |
| Agent No. 2 | gals | 15 |
| Diacetone alcohol | gals | 52 |
| Gals. | | 100 |

EXAMPLE 21 (YELLOW)

| | | |
|---|---|---|
| Chrome yellow light | lbs | 1,500 |
| Soya lecithin | lbs | 8 |
| Agent No. 2 | gals | 15 |
| Agent No. 1 | gals | 1 |
| Diacetone alcohol | gals | 51 |
| Gals. | | 100 |

EXAMPLE 22 (BLUE)

| | | |
|---|---|---|
| Ultramarine blue | lbs | 900 |
| Soya lecithin | lbs | 8 |
| Agent No. 2 | gals | 14 |
| Diacetone alcohol | gals | 44 |
| Gals. | | 100 |

EXAMPLE 23 (YELLOW)

| | | |
|---|---|---|
| Hansa Toluidine yellow | lbs | 350 |
| Soya lecithin | lbs | 8 |
| Agent No. 2 | gals | 14 |
| Diacetone alcohol | gals | 59 |
| Gals. | | 100 |

EXAMPLE 24 (WHITE)

| | | |
|---|---|---|
| Talc-magnesium silicate | lbs | 710 |
| Soya lecithin | lbs | 32 |
| Agent No. 2 | gals | 15 |
| Agent No. 1 | gals | 2 |
| MDT | gals | 50½ |
| Gals. | | 100 |

The examples discussed above, when added to paint, showed between 0 and 1% reflectance difference on both the float check and rub-up check. These were very satisfactory results and for many uses a greater reflectance actually can be tolerated. In many examples, no float or rub-up appeared.

The above pigment concentrates are added to white, colored, or inert-pigmented paints in vehicles of any type. Purely by way of example, showing typical paints to which any of the above pastes may be added, the following Tables V are furnished.

TABLE V
*Sample white and inert paint formulations*

EXAMPLE 25 WHITE OIL PAINT—EXTERIOR HOUSE PAINT

| | | |
|---|---|---|
| Rutical RC — titanium dioxide and calcium sulfate | lbs | 536 |
| Magnesium silicate | lbs | 180 |
| Raw linseed oil | gals | 28 |
| Bodied linseed oil | gals | 7 |
| Mineral spirits | gals | 4 |
| Paste total | lbs | 996 |
| Bodied linseed oil | gals | 16 |
| Mineral spirits | gals | 18 |
| Drier (cobalt naphthenate, lead naphthenate, manganese naphthenate) | gals | 3 |
| Gals. | | 102.5 |

EXAMPLE 26 INERT OIL PAINT—EXTERIOR HOUSE PAINT

| | | |
|---|---|---|
| Lead oxide | lbs | 3 |
| Calcium carbonate | lbs | 230 |
| Magnesium silicate | lbs | 100 |
| Raw linseed oil | gals | 20 |
| Boiled linseed oil | gals | 5 |
| Mineral spirits | gals | 6 |
| Paste total | lbs | 582 |
| Raw linseed oil | gals | 20 |
| Boiled linseed oil | gals | 10 |
| Mineral spirits | gals | 22 |
| Drier (cobalt naphthenate, lead naphthenate, manganese naphthenate) | gals | 5 |
| Gals. | | 102.5 |

EXAMPLE 27 WHITE LATEX INTERIOR HOUSE PAINT

| | | |
|---|---|---|
| Titanium dioxide (Rutile) | lbs | 220 |
| Diatomaceous silica | lbs | 50 |
| Magnesium silicate | lbs | 60 |
| Aluminum silicate | lbs | 80 |
| Phenyl mercuric borate | lbs | 2 |
| 16% soya protein solution in water | gals | 23 |
| Demineralized water | gals | 14 |
| Paste total | lbs | 734 |
| Styrene butadiene latex | gals | 45 |
| Demineralized water | gals | 4 |
| Gals. | | 102.5 |

EXAMPLE 28 INERT LATEX INTERIOR HOUSE PAINT

| | | |
|---|---|---|
| Diatomaceous silica | lbs | 56 |
| Magnesium silicate | lbs | 82 |
| Phenyl mercuric borate | lbs | 2 |
| Aluminum silicate | lbs | 120 |
| Demineralized water | gals | 12 |
| 16% soya protein solution in water | gals | 24½ |
| Paste total | lbs | 575 |
| Styrene butadiene latex | gals | 50 |
| Demineralized water | gals | 2 |
| Gals. | | 102.5 |

EXAMPLE 29 WHITE ALKYD INTERIOR HOUSE PAINT

| | | |
|---|---|---|
| Diatomaceous silica | lbs | 90 |
| Rutile titanium dioxide | lbs | 275 |
| Calcium carbonate | lbs | 400 |
| Soya modified alkyd | gals | 14 |
| Odorless mineral spirits | gals | 42 |
| Paste total | lbs | 1,215 |
| Odorless mineral spirits | gals | 12 |
| Soya modified alkyd | gals | 4 |
| 6% cobalt tallate drier | gal | ¼ |
| Gals. | | 102.5 |

EXAMPLE 30 INERT ALKYD INTERIOR HOUSE PAINT

| | | |
|---|---|---|
| Diatomaceous silica | lbs | 100 |
| Calcium carbonate | lbs | 552 |
| Soya modified alkyd | gals | 20 |
| Odorless mineral spirits | gals | 46 |
| Paste total | lbs | 1,182 |
| Odorless mineral spirits | gals | 7 |
| 6% cobalt tallate drier | gal | ¼ |
| Gals. | | 102.5 |

As stated earlier, the concentrates of the present invention may be used in a tube system, a fixed quantity (e.g., two 1-oz. tubes per gallon of white paint, for tints, or two 4-oz. tubes per gallon of inert paint for deep colors) being added.

Also, as stated earlier, practically any desired color may be achieved in practically any vehicle by other non-standardized mixes, thereby simplifying "special-order" mixes. Tables VI give three examples of this procedure, by way of example.

TABLE VI

*Sample color formulations using white and inert paints*

EXAMPLE 31 MEDIUM GREEN ALKYD PAINT

| | | |
|---|---|---|
| Alkyd inert | gals | 60 |
| Alkyd white | gals | 36 |
| Example #20 chromium oxide (Table IV) | lbs | 110 |
| Example #8 phthalocyanine blue | lbs | 2½ |
| Gals. | | 100 |

EXAMPLE 32 DARK BROWN OIL PAINT

| | | |
|---|---|---|
| Oil paint inert | gals | 68 |
| Oil paint white | gals | 23 |
| Example #15 lampblack | lbs | 80 |
| Example #5 red oxide | lbs | 40 |
| Example #12 ferrite yellow | lbs | 10 |
| Gals. | | 100 |

EXAMPLE 33 MEDIUM RED LATEX PAINT

| | | |
|---|---|---|
| Latex white | gals | 58 |
| Latex inert | gals | 38 |
| Example #5 red oxide | lbs | 40 |
| Example #2 BON red | lbs | 8½ |
| Example #12 ferrite yellow | lbs | 5¾ |
| Gals. | | 100 |

Exposure tests have been made on various paints containing varying amounts of colored pastes. A 45° south exposure on a test fence has run for nine months with satisfactory results. Satisfactory results have also been obtained when painted panels were given either 100 hours in the Fadeometer or 500 hours in the Weatherometer. In many cases these exposure tests showed that the paints containing oil, alkyd or latex as their vehicle and made with the pigment concentrates of this invention were superior to similar products using the standard methods of manufacturing. In all cases products made with the pigment concentrates were equal to the similar products made without the pigment concentrates.

There are several ways by which the pigment concentrate can be manufactured, the following being an excellent method: The raw pigment, solvent, and wetting agents may be combined in a mixer having sufficient power to give a coarse dispersion of the pigment and wetting agent in the solvent. The mixture may then be further dispersed using equipment that is standard in the paint and ink industries for such purposes—such as roller mills, ball mills, pebble mills, high-speed stone dispersion mills (such as the Morehouse Mill) and mills employing high shear (such as the Baker-Perkins Mill). In any event, the paste is ground to a fineness of 7½ on the North Standard of Fineness Gauge, thereby making them suitable for use in gloss enamels and lacquers while retaining the original gloss of the product. The colored pastes may be filled into tubes, drums, or other containers. By matching them against established standards, the colored paste may be controlled for shade and tinting strength so that they can be used in the "tube system" mentioned at the beginning of this application. Or the resultant paste may be used as a source or color in a factory to change or alter color of a white or colored paint during the manufacture of paint of various colors.

The present invention thus not only solves the storage problem for paint dealers and gives a wide variety of colors produced by adding a measured variety of pigment concentrate in any vehicles, but also has many other uses.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A pigment concentrate in paste form, consisting essentially of about 40% to 75% by volume of a solvent compatible with paint bases of oil and latex type and having an evaporation rate of between 5 and 500 hours, chosen from the group consisting of diacetone alcohol and the alkyl ethers and acetates of the ethylene and propylene glycols, having between 3 and 14 carbon atoms; about 10% to 25% by volume of a wetting agent combination of one part soya lecithin to between one and fifteen parts of the mixture of (1) one part of the high-temperature condensate of a dialkanolamine ethylene diamine tetraacetic acid, and a fatty acid with at least 8 carbon atoms and (2) five to seven parts of an ester of polyethylene glycol and a fatty acid having between 12 and 18 carbon atoms; and about 10% to 40% by volume of pigment, said pigment concentrate in paste form having a viscosity between about 70–140 Kreb units.

2. A pigment concentrate in paste form, consisting essentially of about 40% to 75% by volume of a solvent compatible with paint bases of oil and latex type and having an evaporation rate of between 5 and 500 hours, chosen from the group consisting of diacetone alcohol and mono-di-tri-propylene glycol of methyl ether and mixtures thereof; about 10% to 25% by volume of a wetting agent combination of one part of soya lecithin and between one and fifteen parts of the mixture of one part of the high-temperature condensate of a dialkanolamine, ethylenediamine tetraacetic acid, and a fatty acid having at least 8 carbon atoms, and between five and seven parts of the ester of polyethylene glycol and an unsaturated fatty acid having between 12 and 18 carbon atoms; and about 10% to 40% by volume of pigment, said pigment concentrate in paste form having a viscosity between about 70–140 Kreb units.

3. A pigment concentrate suitable for addition to both latex-base and oil-base paints, consisting essentially of about 40% to 75% by volume of a solvent chosen from the group consisting of diacetone alcohol and the approximately 40%, 42%, 18% mono-di-tri-propylene glycol of methyl ether, and mixtures thereof; about 8% to 20% by volume of a wetting agent consisting essentially of 5 to 7 parts of an ester of polyethylene glycol and an unsaturated fatty acid having between 12 and 18 carbon atoms, per 1 part of the condensate at between 300° F. and 375° F. of a dialkanolamine, ethylene diamine tetraacetic acid, and a fatty acid having at least 8 carbon atoms; about 1% to 8% by volume of soya lecithin; and the remainder of pigment, said pigment concentrate in paste form having a viscosity between about 70–140 Kreb units.

4. A pigment concentrate, consisting essentially of: a pigment; a solvent chosen from the group consisting of diacetone alcohol and mono-, di-, tri-propylene glycols of methyl ether and mixtures of them, sufficient solvent being included to achieve a viscosity of the concentrate of between 70 and 140 Kreb units; and a combination of wetting agents, one of which acts to aid dispersion of pigments in oil-type vehicles and one of which acts to aid dispersion of pigments in water-type vehicles, the pigment wetting agent particularly aiding oil-dispersion being soya lecithin and the pigment wetting agent particularly aiding water disperson consisting essentially of a mixture of (1) one part of the condensate at a temperature between 300° F. and 375° F. of a dialkanolamine, a fatty acid having at least 8 carbon atoms, and ethylenediamine tetraacetic acid and (2) between five and seven parts of an ester of an unsaturated fatty acid having between 12 and 18 carbon atoms and polyethylene glycol, the ratio of the total solvent to the total wetting agent lying in the range between 2.4 to 1 and 5.2 to 1, the ratio of soya lecithin to the pigment wetting agent aiding water dispersion being in the range between 1 to 15 and 1 to 1.

5. A pigment concentrate, consisting essentially of: about 40% to 75% by volume of solvent compatible with both oil and water paint bases and having an evaporation rate of between about 5 and 500 hours, said solvent being chosen from the group consisting of diacetone alcohol and the alkyl ethers and acetates of the ethylene and propylene glycols, having between 3 and 14 carbon atoms; about 10% to 25% by volume of wetting agent combination of at least two wetting agents, at least one particularly aiding dispersion of pigments in oil-type vehicles and at least one particularly aiding dispersion of pigments in water-type vehicles said wetting agents consisting of soya lecithin and at least one of (1) the high-temperature condensate of a dialkanolamine, ethylenediamine tetraacetic acid, and a fatty acid having at least eight carbon atoms and (2) the ester of polyethylene glycol and an unsaturated fatty acid having between 12 and 18 carbon atoms and mixtures thereof; the ratio of (1) to (2) being between 1:5 and 1:7 and the ratio of soya lecithin to the mixture of (1) and (2) being between 1:2 and 1:7 and about 10% to 40% by volume of pigment.

6. A pigment concentrate, consisting essentially of: about 40% to 75% by volume of solvent compatible with both oil and water paint bases and having an evaporation rate of between about 5 and 500 hours, said solvent being chosen from the group consisting of (a) 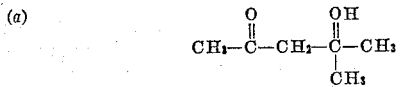

(b) $CH_3(CH_2)_m$—O—$(CH_2)_n$—O—$R_1$ (c) $CH_3(CH_2)_m$—O—$(CH_2)_n$—O—$(CH_2)_p$—O—$R_1$ (d) $CH_3(CH_2)_q$—O—$(CH_2)_n$—O—$(CH_2)_p$—O—$(CH_2)_r$—O—$R_2$ where $R_1$ is a radical chosen from the group consisting of (e) —H (f) 

and (g) —$(CH_2)_sCH_3$ and $R_2$ is a radical chosen from the group consisting of (h) —H (i) 

and (j) —$(CH_2)_tCH_3$ and where $m$, $n$, $p$, $q$, $r$, $s$, and $t$ represent integers, $m$, $r$, and $s$ having any value of 0 through 3, $n$ and $p$ any value of 2 through 3, and $q$ and $t$ any value of 0 through 1; about 10% to 25% by volume of wetting agent combination of at least two wetting agents, at least one particularly aiding dispersion of pigments in oil-type vehicles and at least one particularly aiding dispersion of pigments in water-type vehicles, said wetting agents consisting of one part of soya lecithin and between one and fifteen parts of at least one of (1) one part of the high-temperature condensate of a dialkanolamine, ethylenediamine tetraacetic acid, and a fatty acid having at least eight carbon atoms and (2) between five and seven parts of the ester of polyethylene glycol and an unsaturated fatty acid having between 12 and 18 carbon atoms and mixtures thereof; and about 10% to 40% by volume of pigment.

7. A pigment concentrate consisting essentially of: a pigment; a solvent that is miscible in paint bases of both oil and water types; sufficient solvent being included to achieve a viscosity of the concentrate of between 70 and 140 Kreb units, said solvent being chosen from the group consisting of (a) 

(b) $CH_3(CH_2)_m$—O—$(CH_2)_n$—O—$R_1$ (c) $CH_3(CH_2)_m$—O—$(CH_2)_n$—O—$(CH_2)_p$—O—$R_1$ (d) $CH_3(CH_2)_q$—O—$(CH_2)_n$—O—$(CH_2)_p$—O—$(CH_2)_r$—O—$R_2$ where $R_1$ is a radical chosen from the group consisting of (e) —H (f) 

and (g) —$(CH_2)_sCH_3$ and $R_2$ is a radical chosen from the group consisting of (h) —H (i) 

and (j) —$(CH_2)_tCH_3$ and where $m$, $n$, $p$, $q$, $r$, $s$, and $t$ represent integers, $m$, $r$, and $s$ having any value of 0 through 3, $n$ and $p$ any value of 2 through 3, and $q$ and $t$ any value of 0 through 1; soya lecithin; and a mixture of (1) the high temperature condensate of a dialkanolamine, a fatty acid having at least 8 carbon atoms, and ethylenediamine tetraacetic acid and (2) an ester of an unsaturated fatty acid having between 12 and 18 carbon atoms, and polyethylene glycol the ratio of (1) to (2) being between 1:5 and 1:7, the ratio of soya lecithin to the mixture of (1) and (2) being between 1:1 and 1:15, and the ratio of solvent to the total of soya lecithin and the mixture of (1) and (2) being between 2.4:1 and 5.2:1.

8. A method of making paint comprising the steps of thoroughly mixing a dry pigment with a solvent chosen from the group consisting of (a) 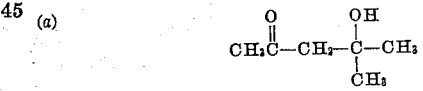

(b) $CH_3(CH_2)_m$—O—$(CH_2)_n$—O—$R_1$ (c) $CH_3(CH_2)_m$—O—$(CH_2)_n$—O—$(CH_2)_p$—O—$R_1$ (d) $CH_3(CH_2)_q$—O—$(CH_2)_n$—O—$(CH_2)_p$—O—$(CH_2)_r$—O—$R_2$ where $R_1$ is a radical chosen from the group consisting of (e) —H (f) 

and (g) —$(CH_2)_sCH_3$ and $R_2$ is a radical chosen from the group consisting of (h) —H (i) 

and (j) —$(CH_2)_tCH_3$ and where $m$, $n$, $p$, $q$, $r$, $s$, and $t$ represent integers, $m$, $r$, and $s$ having any value of 0 through 3, $n$ and $p$ any value of 2 through 3, and $q$ and $t$ any value of 0 through 1; and with soya lecithin and a mixture of (1) the high temperature condensate of a dialkanolamine, a fatty acid having at least 8 carbon atoms, and ethylenediamine tetraacetic acid and (2) an ester of an unsaturated fatty acid having between 12 and 18 carbon atoms, and polyethylene glycol, the ratio of (1) to (2) lying in the range between about 1:5 and 1:7 and the ratio of soya lecithin to the mixture of (1) and (2) lying in the range between about 1:1 and 1:15, and the ratio of the total of the soya lecithin and the mixture of (1) and (2) to the solvent lying in the range between 2.4 to 1 and 5.2 to 1; and later dispersing the resultant paste in a paint vehicle of any type.

9. A pigment concentrate comprising 40% to 75% by volume of solvent, 10%–25% by volume of a wetting agent mixture, and 10%–40% by volume of pigment; said solvent comprising a glycol having between 3 and 14 carbon atoms and an evaporation rate of between 5 and 500 hours; said wetting agent mixture comprising about one part of soya lecithin to between one and to 15 parts a mixture of (1) a high temperature condensate of a dialkanolamine, ethylene diamine tetraacetic acid and a fatty acid of at least 8 carbon atoms and (2) an ester of a polyethylene glycol and a fatty acid having between 12 and 18 carbon atoms said concentrate of the above named ingredients being compounded in the relative proportions determined by selecting a point lying within the area defined by a polygon 1, 2, 3, 4 and 5 on the figure of the drawing.

10. A pigment concentrate comprising 40% to 75% by volume of solvent; 10%–25% by volume of a wetting agent mixture, and 10%–40% by volume of pigment; said solvent comprising a glycol ether in which the glycol radical contains from 3 to 14 carbon atoms and the other radical of the glycol ether is an alkyl radical containing from one to four carbon atoms; said wetting agent mixture comprising about one part of soya lecithin to between one and to 15 parts of a mixture of a (1) high temperature condensate of a dialkanolamine, ethylene diamine tetraacetic acid, and a fatty acid of at least 8 carbon atoms and (2) an ester of a polyethylene glycol and a fatty acid having between 12 and 18 carbon atoms, said concentrate of the above named ingredients being compounded in the relative proportions determined by selecting a point lying within the area defined by a polygon 1, 2, 3, 4 and 5 on the figure of the drawing.

11. A pigment concentrate comprising 40%–75% by volume of solvent; 10%–25% by volume of a wetting agent mixture, and 10%–40% by volume of pigment, said solvent comprising a glycol ester of a lower fatty acid in which the glycol radical contains from 3 to 14 carbon atoms and the fatty acid from two to four carbon atoms; said wetting agent mixture comprising about one part of soya lecithin to between one and to 15 parts of a mixture of a (1) high temperature condensate of a dialkanolamine, ethylene diamine tetraacetic acid, and a fatty acid of at least 8 carbon atoms and (2) an ester of a polyethylene glycol and a fatty acid having between 12 and 18 carbon atoms.

12. A pigment concentrate comprising 40%–75% by volume of solvent; 10%–25% by volume of wetting agent mixture, and 10%–40% by volume of pigment; said solvent having been selected from the group consisting of diacetone alcohol and the alkyl ethers and acetates of ethylene and propylene glycols having between 3 and 14 carbon atoms; said wetting agent mixture comprising about one part of soya lecithin and from 1 to 15 parts of (1) a high temperature condensate of a dialkanolamine, ethylene diamine tetraacetic acid and a fatty acid of at least 8 carbon atoms, (2) an ester of polyethylene glycol and a fatty acid having between 12 and 18 carbon atoms and (3) the reaction product of a polyethylene polyamine having from 2 to 8 carbon atoms with an unsaturated fatty acid having 12–18 carbon atoms, said concentrate of the above named ingredients being compounded in the relative proportions determined by selecting a point lying within the area defined by a polygon 1, 2, 3, 4 and 5 on the figure of the drawing.

References Cited in the file of this patent

UNITED STATES PATENTS

| | | |
|---|---|---|
| 2,161,503 | Bush | June 6, 1939 |
| 2,296,382 | Fischer | Sept. 22, 1942 |
| 2,296,933 | Jordan | Sept. 29, 1942 |
| 2,313,076 | Klinkenstein | Mar. 9, 1943 |
| 2,430,828 | Schmidt | Nov. 11, 1947 |
| 2,515,145 | Van Dijck | July 11, 1950 |
| 2,548,970 | Grate | Apr. 17, 1951 |
| 2,713,006 | Hunter | July 12, 1955 |
| 2,772,982 | Vesce | Dec. 4, 1956 |
| 2,809,122 | Willis et al. | Oct. 8, 1957 |

FOREIGN PATENTS

| | | |
|---|---|---|
| 374,437 | Great Britain | June 6, 1932 |

UNITED STATES PATENT OFFICE
CERTIFICATE OF CORRECTION

Patent No. 2,932,580                        April 12, 1960

Carroll F. Clark et al.

It is hereby certified that error appears in the printed specification of the above numbered patent requiring correction and that the said Letters Patent should read as corrected below.

Column 5, line 20, Table I, first column thereof, for "Methyl Cellololve acetate" read --Methyl Cellosolve acetate--; column 7, line 57, for "considerably--" read --considerably)--; column 9, line 56, Example 7, for "Soya lecithin----lbs--8" read --Soya lecithin----lbs--16--; column 11, line 2, Example 19, for "titanic" read --titanium--; column 18, line 10, after "carbon atoms" and before the period, insert --said concentrate of the above named ingredients being compounded in the relative proportions determined by selecting a point lying within the area defined by a polygon 1, 2, 3, 4 and 5 on the figure of the drawing--.

Signed and sealed this 1st day of November 1960.

(SEAL)
Attest:
KARL H. AXLINE
Attesting Officer

ROBERT C. WATSON
Commissioner of Patents